United States Patent
Khajehoddin et al.

(10) Patent No.: US 9,705,331 B2
(45) Date of Patent: Jul. 11, 2017

(54) SINGLE PHASE POWER SYSTEM CONTROLLER AND METHOD THEREFOR

(71) Applicant: SPARQ Systems Inc., Kingston (CA)

(72) Inventors: Sayed Ali Khajehoddin, Edmonton (CA); Masoud Karimi Ghartemani, Mississippi State, MS (US); Praveen K. Jain, Kingston (CA); Alireza Bakhshai, Kingston (CA)

(73) Assignee: SPARQ SYSTEMS INC., Kingston, ON (CA)

( * ) Notice: Subject to any disclaimer, the term of this patent is extended or adjusted under 35 U.S.C. 154(b) by 316 days.

(21) Appl. No.: 14/205,687

(22) Filed: Mar. 12, 2014

(65) Prior Publication Data

US 2014/0268957 A1    Sep. 18, 2014

Related U.S. Application Data

(60) Provisional application No. 61/790,537, filed on Mar. 15, 2013.

(51) Int. Cl.

| | |
|---|---|
| *H02J 3/18* | (2006.01) |
| *H02M 7/5387* | (2007.01) |
| *H02M 7/44* | (2006.01) |
| *H02M 1/12* | (2006.01) |
| *H02M 1/42* | (2007.01) |
| *G05F 1/67* | (2006.01) |
| *G05F 1/70* | (2006.01) |
| *H02J 3/38* | (2006.01) |

(52) U.S. Cl.
CPC ....... *H02J 3/1842* (2013.01); *H02M 7/53871* (2013.01); *G05F 1/67* (2013.01); *G05F 1/70* (2013.01); *H02J 3/383* (2013.01); *H02M 1/12* (2013.01); *H02M 1/42* (2013.01); *H02M 7/44* (2013.01)

(58) Field of Classification Search
CPC ...... H02M 7/44; H02M 7/53871; H02M 1/12; H02M 1/42; H02J 3/1842; G05F 1/67; G05F 1/70
USPC ........................................................... 363/95
See application file for complete search history.

(56) References Cited

U.S. PATENT DOCUMENTS

2011/0130889 A1* 6/2011 Khajehoddin .......... H02J 3/383
                                                                700/298

OTHER PUBLICATIONS

Akagi, Hirofumi, et al. "Instantaneous Reactive Power Compensators Comprising Switching Devices without Energy Storage Components." IEEE Transactions on Industry Applications, vol. IA-20, No. 3, May/Jun. 1984. pp. 625-630.

(Continued)

*Primary Examiner* — Fred E Finch, III
*Assistant Examiner* — Rafael O De Leon Domenech

(57) ABSTRACT

Provided herein is a single phase power system controller and a method for controlling a single phase power system. The single phase power system controller comprises an error signal generator that generates an error signal from an instantaneous power reference signal and a measured instantaneous output power signal corresponding to the power delivered to a power distribution grid; and a modulator that modulates the error signal according to a trigonometric function of the grid voltage phase angle and produces a control signal for an inverter controller. In accordance with the circuits and methods provided herein, real and reactive power delivered to the grid are controlled simultaneously based on instantaneous output power feedback.

20 Claims, 16 Drawing Sheets

(56) References Cited

OTHER PUBLICATIONS

Kazmierkowski, Marian P. "A Review of Power Theory: Instantaneous Power Theory and Applications to Power Conditioning." IEEE Industrial Electronics Magazine. Fall 2007. p. 46.

Bahrani, Behrooz, et al. "Vector Control of Single-Phase Voltage-Source Converters Based on Fictive-Axis Emulation." IEEE Transactions on Industry Applications, vol. 47, No. 2, Mar./Apr. 2011. pp. 831-840.

Bojoi, Radu Iustin, et al. "Enhanced Power Quality Control Strategy for Single-Phase Inverters in Distributed Generation Systems." IEEE Transactions on Power Electronics, vol. 26, No. 3, Mar. 2011. pp. 798-806.

Kim, Rae-Young, et al. "Instantaneous Control of Average Power for Grid Tie Inverter Using Single Phase D-Q Rotating Frame with All Pass Filter." The 30th Annual Conference of the IEEE Industrial Electronics Society, Nov. 2-6, 2004, Busan, Korea. pp. 274-279.

Saito, Makoto, et al. "Modeling and Control Strategy for a Single-phase PWM Rectifier using a Single-phase Instantaneous Active/Reactive Power Theory." IEICE/IEEE Intelec'03, Oct. 19-23, 2003. pp. 573-578.

* cited by examiner (a)

(b)

(c)

(d)

(e)

SINGLE PHASE POWER SYSTEM CONTROLLER AND METHOD THEREFOR

RELATED APPLICATION

This application claims the benefit of the filing date of U.S. Provisional Patent Application No. 61/790,537, filed on 15 Mar. 2013, the contents of which are incorporated herein by reference in their entirety.

FIELD

This invention relates to circuits and methods for controlling power in single phase grid-connected distributed generation systems.

BACKGROUND

Distributed generation (DG) systems are becoming increasingly attractive for a number of reasons. DG systems are often based on renewable energy resources such as sun, wind and water and thus reduce the amount of greenhouse gasses and other pollutants, help protect against possible shortages of power and outages, provide a more economical solution for remote areas due to transmission costs, reduce transmission system losses and upgrade rates, may offer combined heat and power (CHP) solution to customers, and reduce dependency on fossil fuels.

Electronic power converters are widely used to interface DG systems with the utility grid. Such an interface is equipped with control/sychronization strategies to ensure that controlled power is extracted from the primary source and transferred to the grid without violating the grid codes and standards such as CSA-C22.2, UL 1741, IEEE 1547, and IEC 62109-1. The AC power is typically controlled by controlling the active and reactive powers separately and by controlling the current injected into the grid. The injection of active power is often the main objective in a DG system but it can also provide reactive power to the local load if required.

In a three-phase system, the active and reactive powers can be conveniently controlled using the concept of dq rotating synchronous reference frame (SRF). The dq components of the current signals are DC variables that are proportional to active/reactive powers. Thus, simple proportional-integrating (PI) controllers together with decoupling terms can be used to control those variables.

In single-phase applications, the current dq components can also be generated using $\alpha\beta$-dq transformation where the same three-phase current control strategy can be applied. In such approaches, however, the $\beta$ component is not externally available and needs to be synthesized using a ninety-degree phase-shift operation at the fundamental frequency. The ninety-degree phase-shift operation can be performed by different methods such as time-delay, all-pass filter, Hilbert transform, second-order generalized integrator (SOGI), or an enhanced phase-locked loop (EPLL). In addition to the challenges involved in accurate and efficient realization of the phase-shift operation, its dynamics strongly contribute to a decrease in the speed and the stability margins of the control system.

Another class of power control strategies for single-phase applications is based on performing the control at the fundamental frequency using a proportional-resonant (PR) controller. The current reference is generated as a pure sinusoidal signal whose amplitude and phase angle are controlled. In one approach, which is widely used in multi-stage topologies, to balance the input power extraction with output power injection, the DC link voltage is regulated to a desired value, which results in a reference for the magnitude of the output current. The angle of the current is synchronized with the grid voltage using a PLL.

However, conventional single-phase systems typically exhibit one or more drawbacks, such as slow system response, computational complexity, sensitivity of the control algorythms to system uncertainties and varied operating conditions, and complexities in dealing with harmonics.

SUMMARY

Provided herein is a single phase power system controller, comprising: an error signal generator that generates an error signal from an instantaneous power reference signal and a measured instantaneous output power signal corresponding to the power delivered to a power distribution grid; and a modulator that modulates the error signal according to a trigonometric function of the grid voltage phase angle and produces a control signal for an inverter controller.

One embodiment further comprises an instantaneous power calculator that provides the instantaneous power reference signal from active and reactive power reference values and a grid voltage phase angle. Another embodiment further comprises a phase-locked loop that determines the grid voltage phase angle from the grid voltage.

In one embodiment, inverter controller may be a high gain inverter controller at a grid frequency. In one embodiment, inverter controller may be a resonant inverter controller having high gain at a grid frequency.

In one embodiment, the single phase power system controller may further comprise a harmonic compensation loop that substantially reduces one or more grid current harmonic. The harmonic compensation loop may comprise one or more harmonic controller tuned to one or more grid harmonic. In one embodiment, the one or more harmonic controller receives an input signal derived from the grid current.

In another embodiment, the single phase power system controller further comprises one or more feedback loops that provide one or more adjustable tuning gain according to a constant, to improve dynamic response of the system.

In one embodiment, input to the system is provided by a renewable energy source. In one embodiment, the input to the system is provided by a photovoltaic source.

Also provided herein is a method for controlling a single phase power system, comprising: generating an error signal from an instantaneous power reference signal and a measured instantaneous output power signal corresponding to the power delivered to a power distribution grid; and modulating the error signal according to a trigonometric function of the grid voltage phase angle and producing a control signal for an inverter controller; wherein real and reactive power delivered to the grid are controlled simultaneously based on instantaneous output power feedback.

In one embodiment, the method may further comprise providing the instantaneous power reference signal from active and reactive power reference values and a grid voltage phase angle. In one embodiment, the method may further comprise using a phase-locked loop to determine the grid voltage phase angle from the grid voltage. In one embodiment, the method further comprises using a harmonic compensation loop to substantially reduce one or more grid current harmonic.

The method may further comprise using one or more feedback loops to provide one or more adjustable tuning gain according to a constant, to improve dynamic response of the system.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

In a single-phase system, the instantaneous power comprises a DC component and a double-frequency AC component, whereas a three-phase balanced system only has a DC component. This prevents the use of the instantaneous power as a control variable within a linear time invariant (LTI) system because an LTI system operating at the fundamental frequency cannot have double frequency signals. Therefore, such a strategy does not fall within the concept of LTI systems and accordingly no attempt has been made for its implementation.

According to one aspect of the invention there is provided a controller for a single phase power system comprising a control loop that includes non-LTI components. As described herein, the controller directly acts on the instantaneous power and it eliminates the need for calculating dq components. Thus, the controller obviates the need for a ninety-degree phase-shift operation, and eliminates associated problems caused by the dynamics of such operation. Thus, very fast and stable control is achieved using a control loop that is substantially simplified relative to conventional approaches.

Embodiments described herein control the exchange of power between a single-phase distributed generation (DG) system and a power distribution grid. Rather than controlling the active and reactive powers separately and through the current signal, as is done in conventional techniques, the embodiments act directly on the instantaneous power. This eliminates the conventional need for calculating the active and reactive powers; a calculation that involves filtering/ phase-shifting and slows down the system responses and adds to computational complexity. Moreover, controlling the instantaneous power does not require a separate loop for the current. The controller includes a control loop that comprises linear time-varying elements.

The embodiments described herein provide a control method that is not based on the SRF transformation or decomposition of the current signal into its real and reactive components. The method is directly formulated and derived from an optimization problem, rather than adjusting or improving a conventional method. The resulting unified approach controls the instantaneous power within a single control loop. This obviates the need to phase-shift an operator and achieves dynamically fast performance.

The embodiments described herein provide full control over output power fed to a load such as a power distribution grid. Embodiments are highly robust with respect to uncertainties in system parameters or different working conditions. A further advantage is the ability to directly control and avoid harmonics from injection to the grid.

1. Overview of Conventional Approaches

Figure 1A:
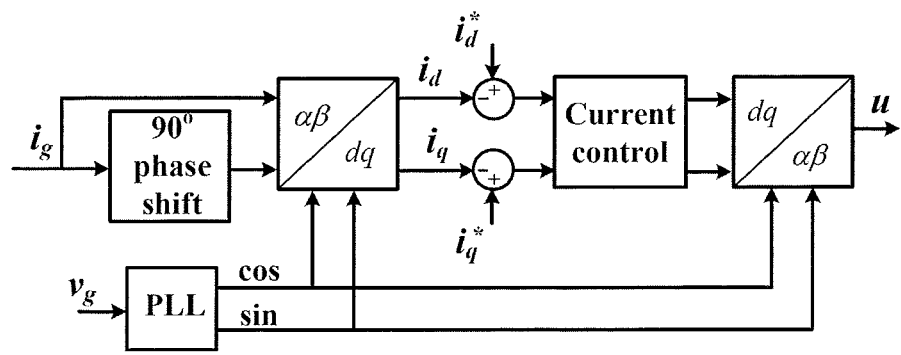
FIG. 1(a) is a block diagram of a conventional single phase active and reactive power control structure.
Figure 1B:
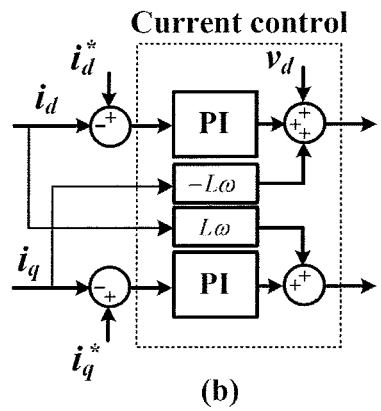
FIG. 1(b) shows a conventional current control block.
Figure 1C:
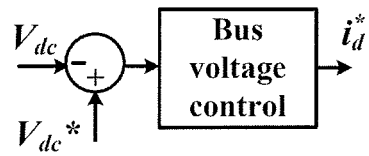
FIGS. 1(c)-1(e) show conventional active and reactive current reference generation structures.
Figure 1D:
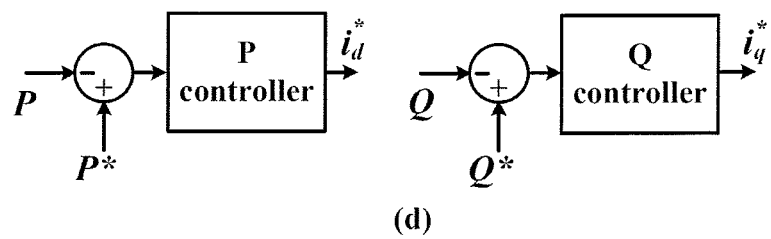
Figure 1E:
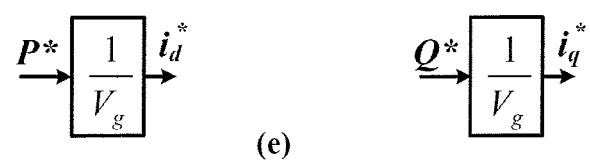
Figure 2:
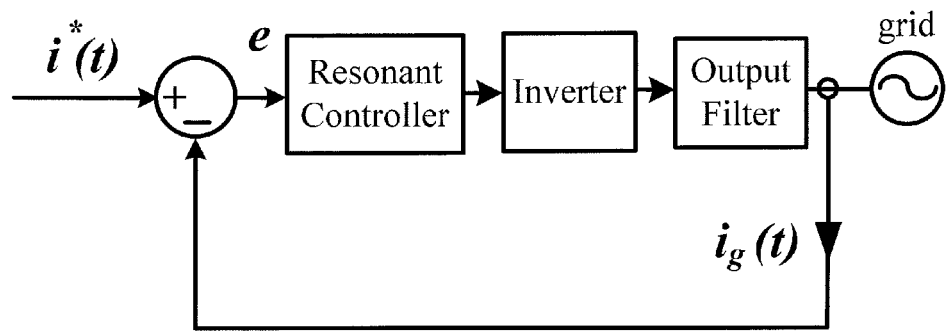
FIG. 2 is a block diagram of a conventional inverter control loop.

FIG. 1(a) shows a conventional control technique to regulate the active and reactive powers in single phase systems. This structure is derived from well-known three phase power control systems. In these approaches $i_d$ and $i_q$ are DC variables proportional to active and reactive powers. As a result, simple PI controllers can be used to regulate the active and reactive current components as shown in FIG. 1(b). Moreover, the references for the current components can be generated as shown in FIGS. 1(c)-1(e). A conventional inverter control loop is shown in FIG. 2.

In FIG. 1(a), αβ-dq transformation is used to generate $i_d$ and $i_q$. In a three-phase system, this transformation can be easily done as abc-αβ transformation is readily implemented.

However, in single phase systems, the β component needs to be synthesized using a ninety-degree phase-shift operation at the fundamental frequency (FIG. 1(a)). The quadrature (or ninety-degree phase-shifted) component can be generated by different methods such as time delay, all-pass filter, Hilbert transform, second-order generalized integrator (SOGI), or enhanced phase-locked loop. Implementation of the ninety-degree phase-shift operation is challenging since the current has a wide range of variations, can have variable frequency, and will show higher level of noise compared to voltage. As a result, strong filters should be used which makes the overall system slow and may create stability problems. Even in the absence of such filters, the 90-degree phase-shift operation itself creates dynamics in the system that interferes with the control loop and is a barrier to increasing the speed of system responses. A method was proposed to avoid this delay based on an imaginary system called fictive axis to decrease the impact of delay dynamics on the system performance.

To explain the effect of phase-shift operation on the control loop, the following analysis is presented. Assume that the voltage signal is $v_g(t) = V_g \cos \omega_o t$ and the measured current signal feedback is expressed as $$i_g(t) = x(t)\cos \omega_o t - y(t) \sin \omega_o t.$$

The variables x and y denote the active and reactive components of the current. To obtain the β component, the phase-shifted version of the current can be found as $$i_g\left(t - \frac{T_o}{4}\right) = x\left(t - \frac{T_o}{4}\right)\sin\omega_o t + y\left(t - \frac{T_o}{4}\right)\cos\omega_o t,$$

where $$f_o = \frac{\omega_o}{2\pi} = \frac{1}{T_o}$$

is the grid frequency. The application of the αβ-dq transformation yields to:

$$\begin{aligned} i_d &= \cos\omega_o t\, i_g(t) + \sin\omega_o t\, i_g\left(t - \frac{T_o}{4}\right) \\ &= x(t)\cos^2\omega_o t + x\left(t - \frac{T_o}{4}\right)\sin^2\omega_o t - \ldots \ldots - \\ &\quad \left[y(t) - y\left(t - \frac{T_o}{4}\right)\right]\sin\omega_o t\cos\omega_o t, \end{aligned} \quad (1)$$

$$\begin{aligned} i_q &= -\sin\omega_o t\, i_g(t) + \cos\omega_o t\, i_g\left(t - \frac{T_o}{4}\right) \\ &= y(t)\sin^2\omega_o t + y\left(t - \frac{T_o}{4}\right)\cos^2\omega_o t - \ldots \ldots - \\ &\quad \left[x(t) - x\left(t - \frac{T_o}{4}\right)\right]\sin\omega_o t\cos\omega_o t. \end{aligned}$$

It is desirable that the $i_d$ and $i_q$ become equal to x and y, however, it is observed from (1) that $i_d$ and $i_q$ converge to x and y in the steady state when the signals are settled, i.e. when $$x(t) = x\left(t - \frac{T_o}{4}\right) \text{ and } y(t) = y\left(t - \frac{T_o}{4}\right).$$

In transient intervals, however, there could be a significant difference between those signals. Such differences and couplings have not been taken into consideration in the design of conventional PI controllers in FIGS. 1(a)-1(e). By increasing the PI gains, the loop bandwidth increases and the effect of those unmodeled couplings becomes stronger and can easily cause large oscillations and instability.

Also, in a three-phase system, the β signal is available through the abc/αβ transformation on the current signals without any dynamics. Therefore, the signals $i_d$ and $i_q$ perfectly coincide with x and y; thus this problem does not exist.

2. Instantaneous Power Controller Embodiment

Figure 3:
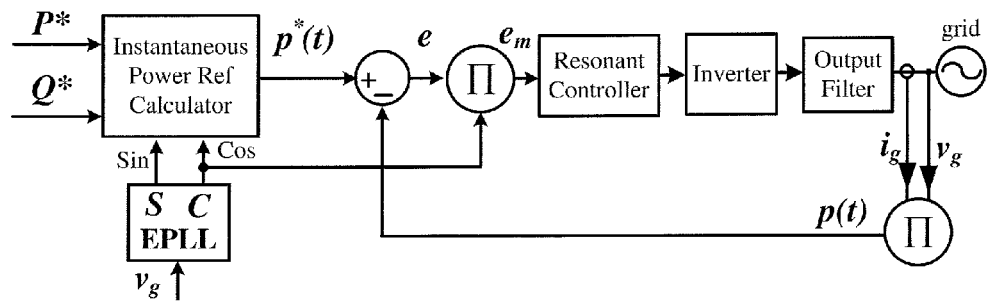
FIG. 3 is a block diagram of a simplified instantaneous power controller according to one embodiment.

An instantaneous power controller according to one embodiment of the invention is shown in FIG. 3. The controller may be implemented in whole or in part using discrete components, using digital technology (e.g., in a digital signal processor (DSP), field programmable gate array (FPGA), or application specific integrated circuit (ASIC) device), or using a combination thereof. For example, one or more components of the controller may be implemented in an algorithm using a suitable hardware language such as, for example, very high speed integrated circuit (VHSIC) hardware descriptive language (VHDL), register transfer language (RTL), or Verilog. Such an algorithm may be implemented in, for example, a FPGA or ASIC device, or other suitable logic device. Use of digital technology provides a controller that is compact and robust.

A stability analysis of the control loop of FIG. 3 is presented below. However, to give more insight into the operation of the system of FIG. 3, the following analysis is presented. Multiplying the signal p(t) with the normalized grid voltage cos ωt results in $$p_m(t) = p(t)\cos\omega t \quad (2)$$
$$= P(1+\cos 2\omega t)\cos\omega t + Q\sin 2\omega t\cos\omega t$$
$$= \frac{3}{2}P\cos\omega t + \frac{1}{2}Q\sin\omega t + \ldots \ldots + \frac{1}{2}P\cos 3\omega t + \frac{1}{2}Q\sin 3\omega t.$$

Therefore, $$e_m(t) = [p^*(t)-p(t)]\cos\omega t \quad (3)$$
$$= (P^*-P)(1+\cos 2\omega t)\cos\omega t + \ldots \ldots + (Q^*-Q)\sin 2\omega t\cos\omega t$$
$$= \frac{3}{2}(P^*-P)\cos\omega t + \frac{1}{2}(Q^*-Q)\sin\omega t + \ldots +$$
$$\frac{1}{2}(P^*-P)\cos 3\omega t + \frac{1}{2}(Q^*-Q)\sin 3\omega t.$$

The following points are observed form equation (3)

The modulated error signal $e_m(t)$ has two AC terms at fundamental and at third harmonics.

The coefficients of both AC terms are related in that if one of the terms is controlled to zero the other one will also approach zero.

Since the sine and cosine functions are orthogonal, if $e_m$ is regulated to zero, all the terms will be regulated to zero.

By regulating $e_m$ to zero, both active and reactive power components will be regulated to their reference values.

Due to the infinite gain of the resonant controller at the fundamental frequency, the signal $e_m$, approaches zero and power control (as well as current control) is achieved.

3. Stability Analysis of the Embodiment of FIG. 3

Figure 4:
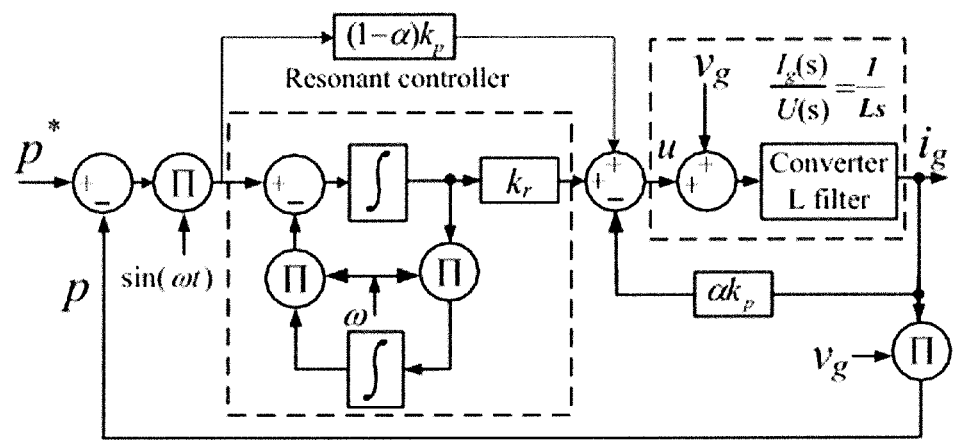
FIG. 4 is a block diagram showing a detailed control loop of a system according to an embodiment with an L-type output filter and having improved dynamic response.

A stability analysis is presented for a converter embodiment with inductive output filter. In a similar way the method can be extended for other types of filter. The detailed control structure consists of a resonant controller $$\frac{k_r s}{s^2+\omega^2}$$

in the forward path and an internal state current feedback with gain $k_p$ as shown in the embodiment of FIG. 4 where the EPLL is not depicted because it does not involve in the stability of the control loop. The constant $\alpha\in[0,1]$ does not have any impact on the closed-loop stability of the linearized system. It is used as an extra tuning gain in order to further adjust the speed with which the power commands are transferred to the output. (It can be shown that $\alpha$ only has impact on the zeros of the system and does not have any impact on poles.) The state space equations of the closed-loop system (for $\alpha=1$) can be written as $$\dot{x}_1 = -\omega x_2 + k_r\cos\omega t(p^*-p) \quad (4)$$
$$\dot{} = -\omega x_2 - k_r V_g \cos^2\omega t x_3 + k_r p^*\cos\omega t$$
$$\dot{x}_2 = \omega x_1$$
$$\dot{x}_3 = \frac{1}{L}x_1 - \frac{k_p}{L}x_3,$$

where $x_1$ and $x_2$ are the state variables of the resonant controller and $x_3$ is the grid current. This set of equations represents a linear time varying (LTV) system with a time-varying reference input.

The equation set (4) has a solution at $$x_1^*(t) = \sqrt{L^2\omega^2+k_p^2}\, I_g^* \sin(\omega t-\phi+\beta)$$

$$x_2^*(t) = -\sqrt{L^2\omega^2+k_p^2}\, I_g^* \cos(\omega t-\phi+\beta)$$

$$x_3^*(t) = I_g^* \sin(\omega t-\phi). \quad (5)$$

where $I_g^*$, $\phi$ are related to $V_g$ and reference powers through $$P^* = \frac{1}{2}V_g I_g^*\cos\phi \text{ and } Q^* = \frac{1}{2}V_g I_g^*\sin\phi \text{ and } \beta = \arctan\left(\frac{L\omega}{k_p}\right).$$

These steady state variables satisfy the following equations $$\dot{x}_1^* = -\omega x_2^* \quad (6)$$
$$\dot{x}_2^* = \omega x_1^*$$
$$\dot{x}_3^* = \frac{1}{L}x_1^* - \frac{k_p}{L}x_3^*.$$

Define the new set of variables as $z=x-x^*$ and derive the state space equations for z as $$\dot{z}_1 = -\omega z_2 - k_r V_g \cos^2\omega t z_3 \quad (7)$$
$$\dot{z}_2 = \omega z_1$$
$$\dot{z}_3 = \frac{1}{L}z_1 - \frac{k_p}{L}z_3,$$

The equation set (7) represents an LTV system with no reference input. Moreover, the state variables z have a DC nature as opposed to x that are sinusoidal. The system equations shown in (7) can be represented as $\dot{z}=A(t)z$ where $A(t)$ is a time-varying matrix. It can further be decomposed into $$\dot{z} = A_0 z + k_r A_1(t) z \quad (8)$$

where the matrices $A_0$ and $A_1$ are given by $$A_0 = \begin{pmatrix} 0 & -\omega & 0 \\ \omega & 0 & 0 \\ \frac{1}{L} & 0 & -\frac{k_p}{L} \end{pmatrix},$$

$$A_1(t) = -V_g\cos^2\omega t \begin{pmatrix} 0 & 0 & 1 \\ 0 & 0 & 0 \\ 0 & 0 & 0 \end{pmatrix}.$$

For the sake of brevity, proof of the stability of (8) is not shown here. The above variables may be summarized as: $x=z$, $f(x)=A_0 x$, $\epsilon=k_r$, $g(t,x,\epsilon)=A_1(t)x$, where, in a practical application, the zero equilibrium point of the system $\dot{x}=f(x)$ must be exponentially stable. To satisfy this requirement, the matrix $A_0$ is modified to $$A_0 = \begin{pmatrix} -2\zeta\omega & -\omega & 0 \\ \omega & 0 & 0 \\ \frac{1}{L} & 0 & -\frac{k_p}{L} \end{pmatrix}.$$

This corresponds to a characteristic polynomial of $s^2+2\zeta\omega S+\omega^2$ for the resonant controller where the value of $\zeta$ is a small positive number. This modification is also justified from the fact that in implementations of the resonant controller for practical applications it is required to add the damping factor $\zeta$ in a digital implementation due to numerical limitations. Having applied this modification, $A_0$ will be an exponentially stable matrix, and g is bounded and T-periodic, and thus the system of (8) is stable. Existence, uniqueness and exponential stability of a T-periodic solution for the system is then concluded from this theorem.

The constant $\epsilon^*$ is obtained from the continuity condition of the matrix $$\frac{\partial f}{\partial x}$$

at the origin. Since this matrix is constant for the system of (8), the constant $\epsilon^*$ becomes arbitrary and can have any large positive value. This results in that the existence, uniqueness and exponential stability of the periodic solution is guaranteed for all positive values of the resonant controller gain $k_r$.

4. Design of the Controller Gains for the Embodiment of FIG. 4

An alternative state space description for the system of (4), which is more suitable for design purposes, is given by $$\dot{x}_1 = -\omega x_2 + k_r\cos\omega t(p^* - p) \qquad (9)$$
$$= -\omega x_2 - V_g\cos^2\omega t x_3 + p^*\cos\omega t$$
$$\dot{x}_2 = \omega x_1$$
$$\dot{x}_3 = \frac{k_r}{L}x_1 - \frac{k_p}{L}x_3.$$

Assuming that $x^*$ is the steady state solution and defining $z=x-x^*$, the equations for z are given as $$\dot{z}_1 = -\omega z_2 - V_g\cos^2\omega t z_3 \qquad (10)$$
$$= -\omega z_2 - \frac{V_g}{2}z_3 - \underbrace{\frac{V_g}{2}\cos(2\omega t)z_3}_{\text{high frequency}}$$
$$\dot{z}_2 = \omega z_1$$
$$\dot{z}_3 = \frac{k_r}{L}z_1 - \frac{k_p}{L}z_3.$$

Since the z variables have DC nature, the high frequency term can be neglected for design purposes. Then the equation (10) can be rewritten as $$\dot{z}=Az+Bu \qquad (11)$$

where u is the standard linear state feedback defined as $u=-Kz$ and matrices A and B are defined as $$A = \begin{pmatrix} 0 & -\omega & 0 \\ \omega & 0 & 0 \\ 0 & 0 & 0 \end{pmatrix}, B = \begin{pmatrix} 0 \\ 0 \\ \frac{1}{L} \end{pmatrix}.$$

Design of the state feedback gains can be done using a method such as Bode diagram, root-locus, and optimal control methods.

5. Harmonic Cancellation Structure

Figure 5:
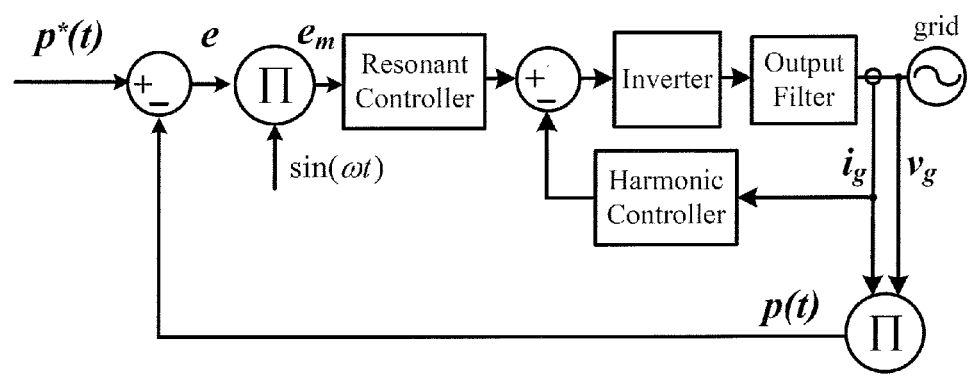
FIG. 5 is a control block diagram of a controller structure with harmonic compensation, according to one embodiment.

To comply with codes and standards for current fed to a power distribution grid, the current fed into the grid must be a clean waveform with low total harmonic distortion (THD). The source of harmonics can be present on the grid voltage or nonlinear loads or non-ideal components in the power circuit. FIG. 5 shows that the power controller embodiments can be further improved to cancel current harmonics. The harmonic controller block is in the form of a number of resonant controllers in parallel tuned at the specific harmonics of interest. This block creates a large loop gain at the harmonic frequencies, which in turn prevents the specific harmonics to appear at the output current. This structure also rejects any harmonic caused by the reference signal. The reference signal may have some harmonics, as these may be generated from the bus voltage (e.g., in two-stage converter topologies) or from the phase locked loop reflecting some of the grid voltage harmonics.

Embodiments of the invention are further described by way of the following non-limiting examples.

Example 1. Simulation

Performance of an embodiment of the controller was evaluated by computer simulations performed using PSIM software (Powersim Inc., Rockville, USA). The power circuit was a 400 V DC link, connected to the grid through a full-bridge VSI and an inductive filter with L=10 mH. The grid voltage rms value was 240 V and its frequency was 60 Hz. The inverter operated using a unipolar PWM technique with a switching frequency of 20 kHz, which amounts to an actual value of 40 kHz seen by the filter.

The conventional method of FIG. 1(a) and the embodiment of FIG. 3 were implemented and compared. The PI controllers were set at $K_p$=75 and $K_i$=3750. The resonant controller embodiment was designed in the digital domain with a sampling frequency of 40 kHz synchronized with the switching frequency. The constant α was selected as 0.5. For the conventional method, there is a trade-off between the speed and the harmonic response of the system. Also, as discussed above, there is a trade-off between the speed and coupling effect caused by the 90-degree phase-shift block. The controller for the conventional was designed for the fastest possible response without causing undesirable instabilities in the transients.

Figure 6A:
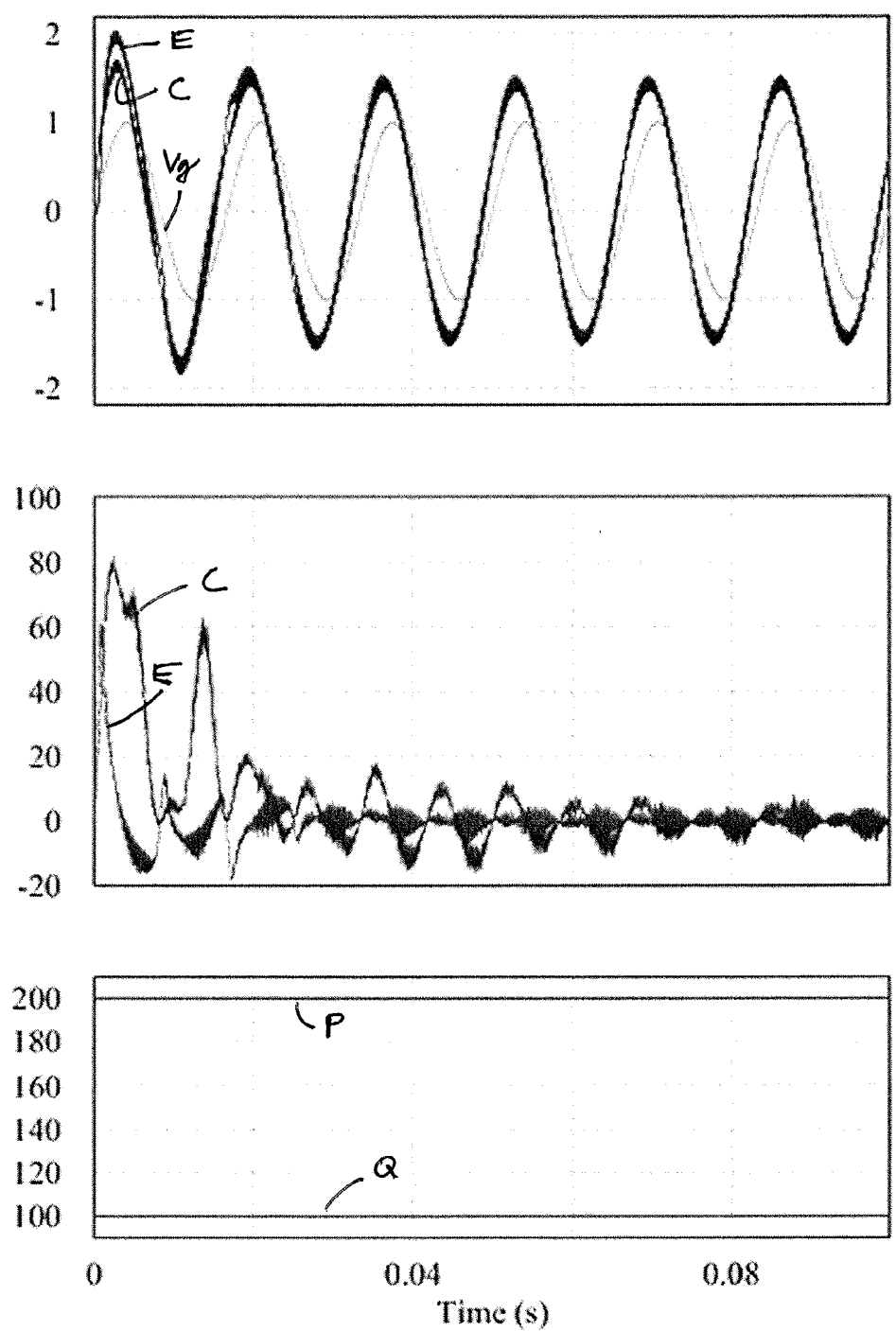
FIG. 6(a) is a plot showing performance of a conventional (C) controller and a controller embodiment (E) during the startup stage: top panel, normalized grid voltage (Vg) and grid current; middle panel, error in instantaneous power; bottom panel, real (P) and reactive (Q) power commands.
Figure 6B:
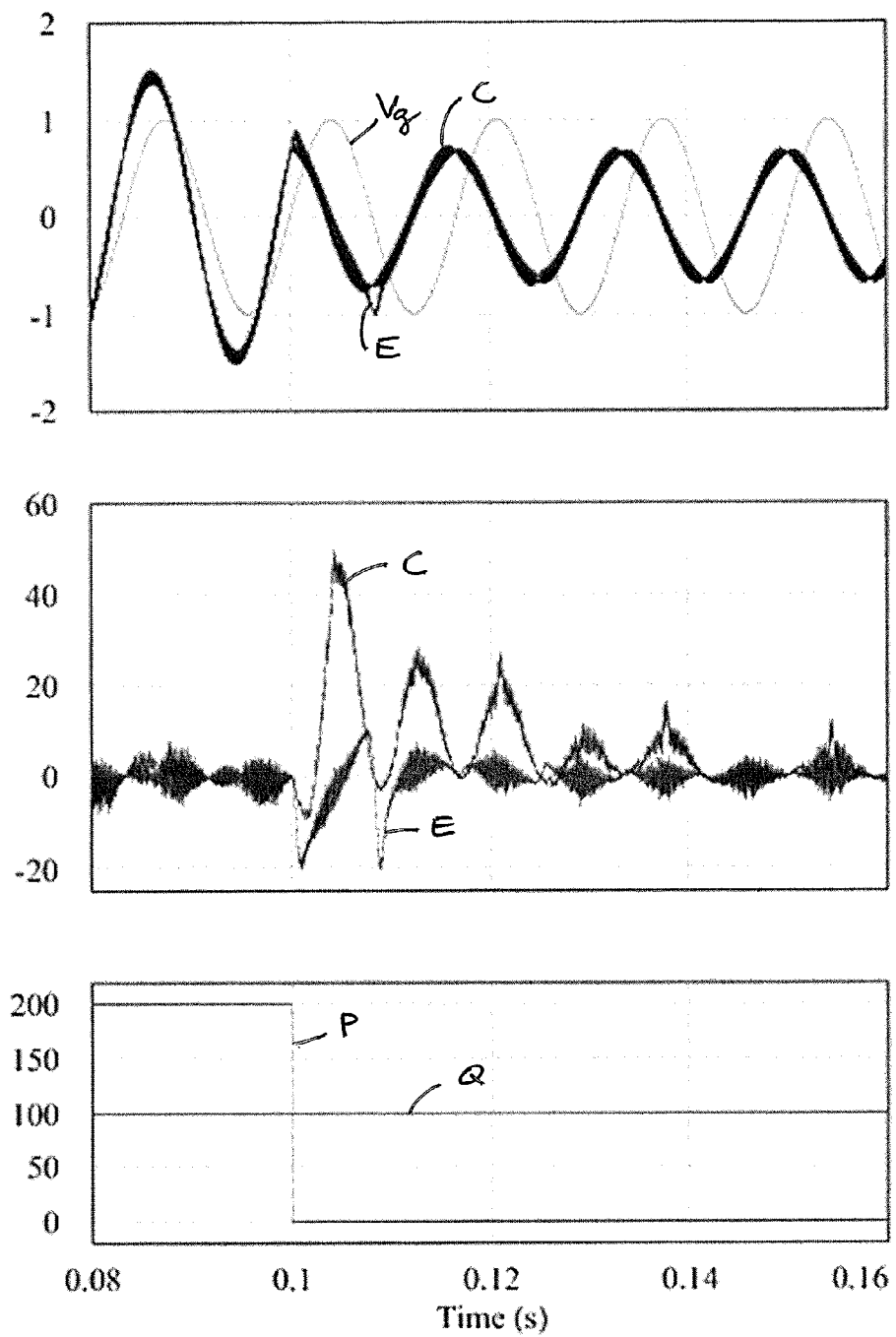
FIG. 6(b) is a plot showing performance of a conventional (C) controller and a controller embodiment (E) during tracking active power transients: top panel, normalized grid voltage (Vg) and grid current; middle panel, error in instantaneous power; bottom panel, real (P) and reactive (Q) power commands.
Figure 6C:
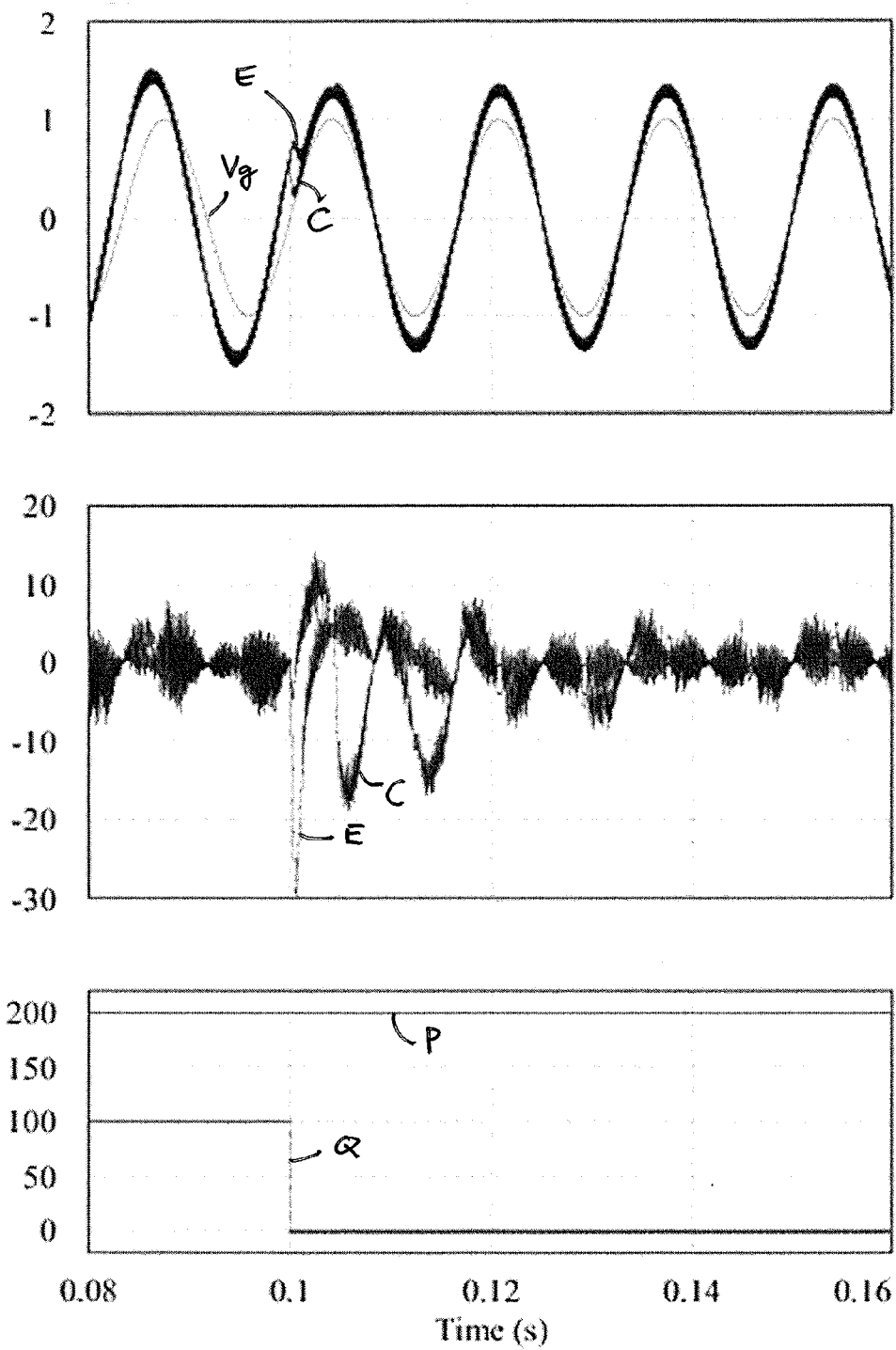
FIG. 6(c) is a plot showing performance of a conventional (C) controller and a controller embodiment (E) during tracking reactive power transients: top panel, normalized grid voltage (Vg) and grid current; middle panel, error in instantaneous power; bottom panel, real (P) and reactive (Q) power commands.
Figure 6D:
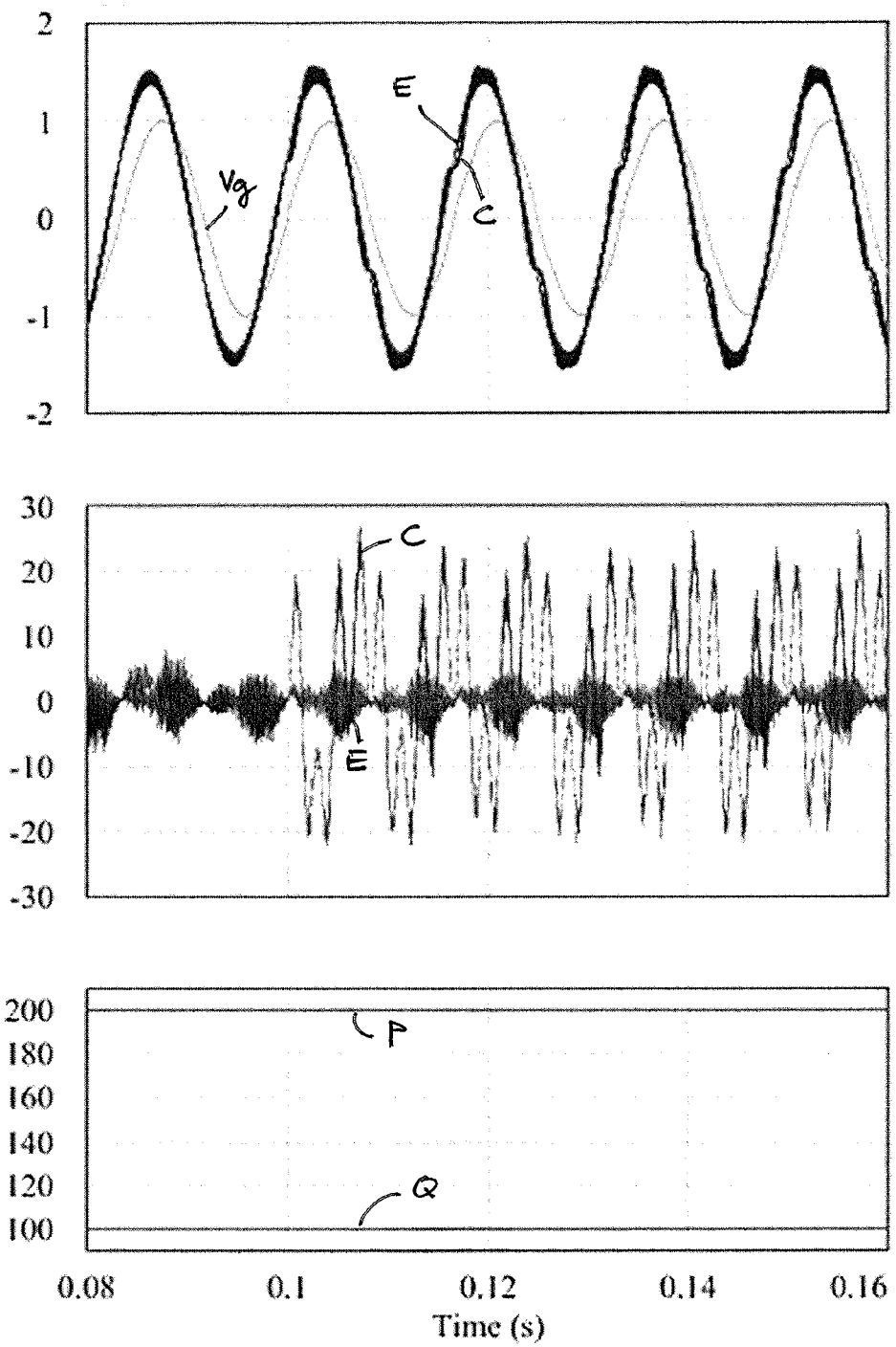
FIG. 6(d) is a plot showing performance of a conventional (C) controller and a controller embodiment (E) with grid voltage harmonics, where THD of the grid voltage is 3.5% and THDs of current for the conventional controller and controller embodiment are 4% and 10%, respectively: top panel, normalized grid voltage (Vg) and grid current; middle panel, error in instantaneous power; bottom panel, real (P) and reactive (Q) power commands.
Figure 6E:
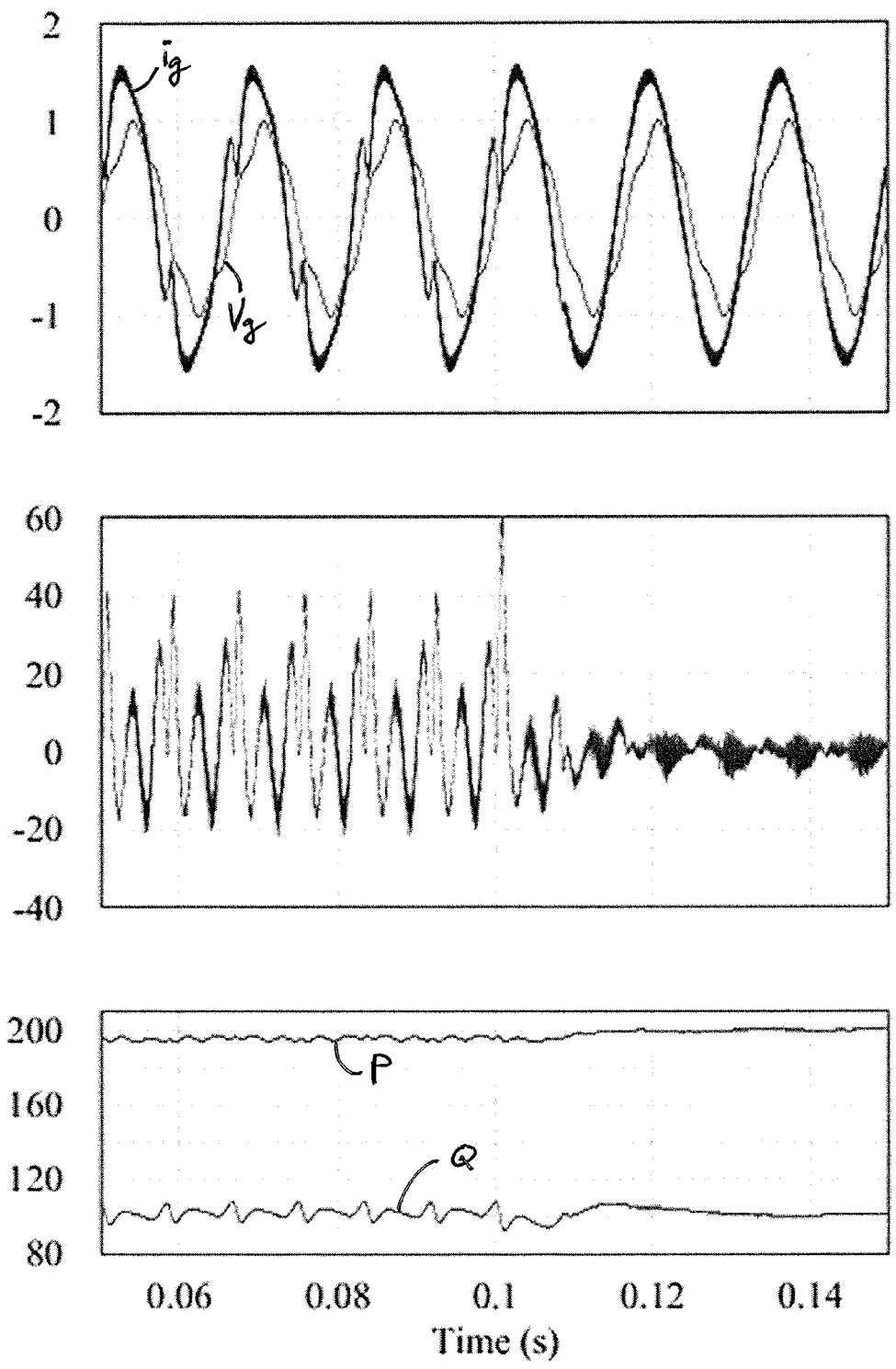
FIG. 6(e) is a plot showing performance of a controller embodiment without and with harmonic compensation: top panel, normalized grid voltage (Vg) and grid current (ig); middle panel, error in instantaneous power; bottom panel, real (P) and reactive (Q) power commands.

Four scenarios were simulated to show performances of the embodiment with regard to start-up, tracking active and reactive power commands, and harmonic rejection. In the first case, shown in FIG. 6(a), start-up is shown for both methods and it can be observed from the middle graph showing the error signal that the embodiment is significantly faster than the conventional design. The second and third cases are shown in FIGS. 6(b) and 6(c) for active and reactive power transients, respectively, at t=0.1 s. These figures show that the embodiment reaches the steady state faster and with smaller oscillations than the conventional method. FIG. 6(d) demonstrates the case where the grid voltage has three harmonic components at the 3rd, 5th and 7th harmonics with 2% amplitudes, which translates to 3.5% total harmonic distortion (THD). In the embodiment the output current has THD=4% and the conventional design has THD=10%. No harmonic compensators are used in FIG. 6(d). To show the effectiveness of the method discussed above, the grid voltage with 5th harmonic was used when the harmonic compensation was activated at t=0.1 s. The results are presented in FIG. 6(e) and show that the 5th harmonic was completely rejected.

Figure 7:
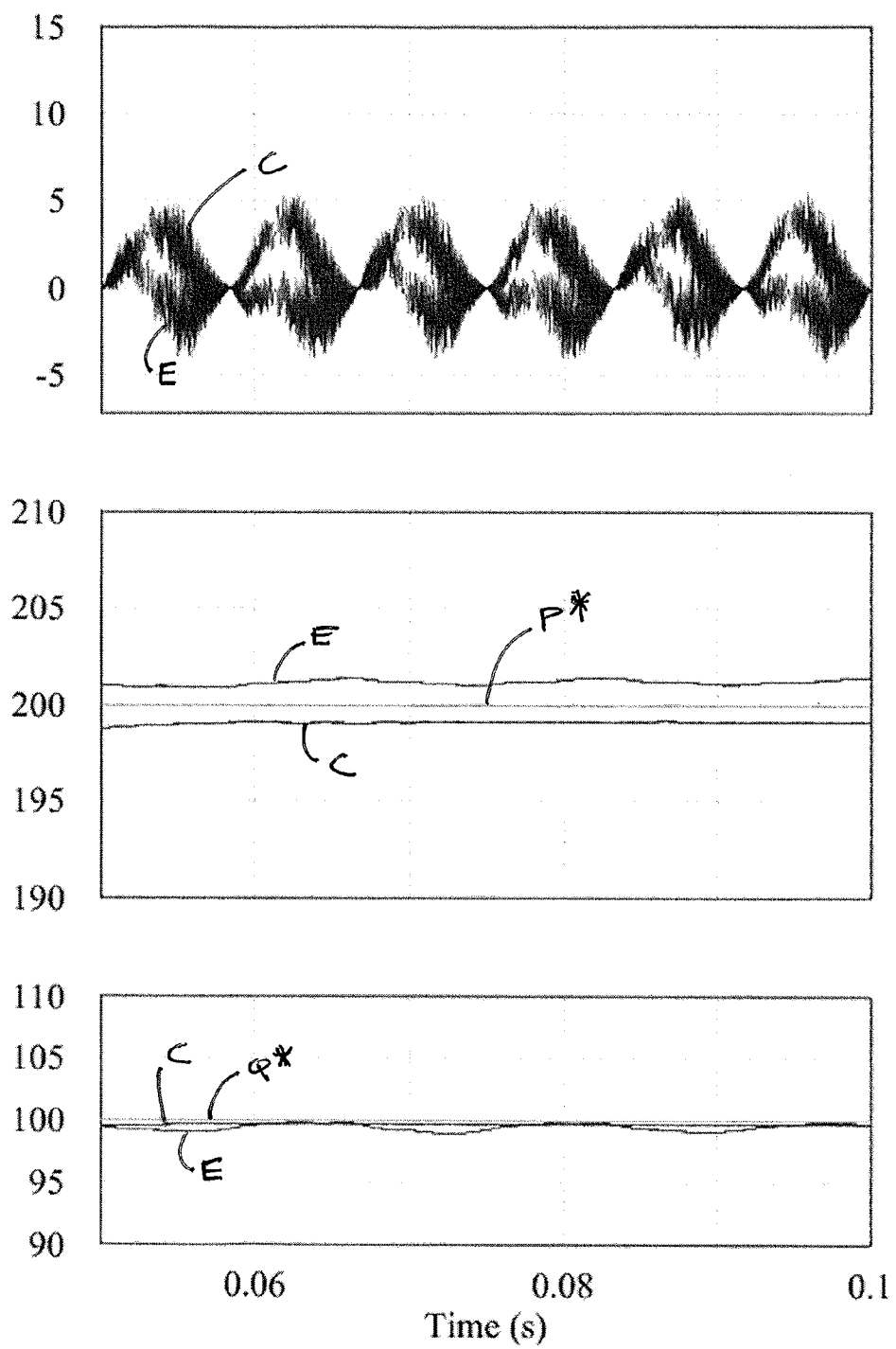
FIG. 7 is a plot showing performance of an embodiment (E) and a conventional (C) method with no uncertainty: top panel, error in instantaneous power; middle panel, real power command and actual real power (P*); bottom panel, reactive power command and actual reactive power (Q*)
Figure 8:
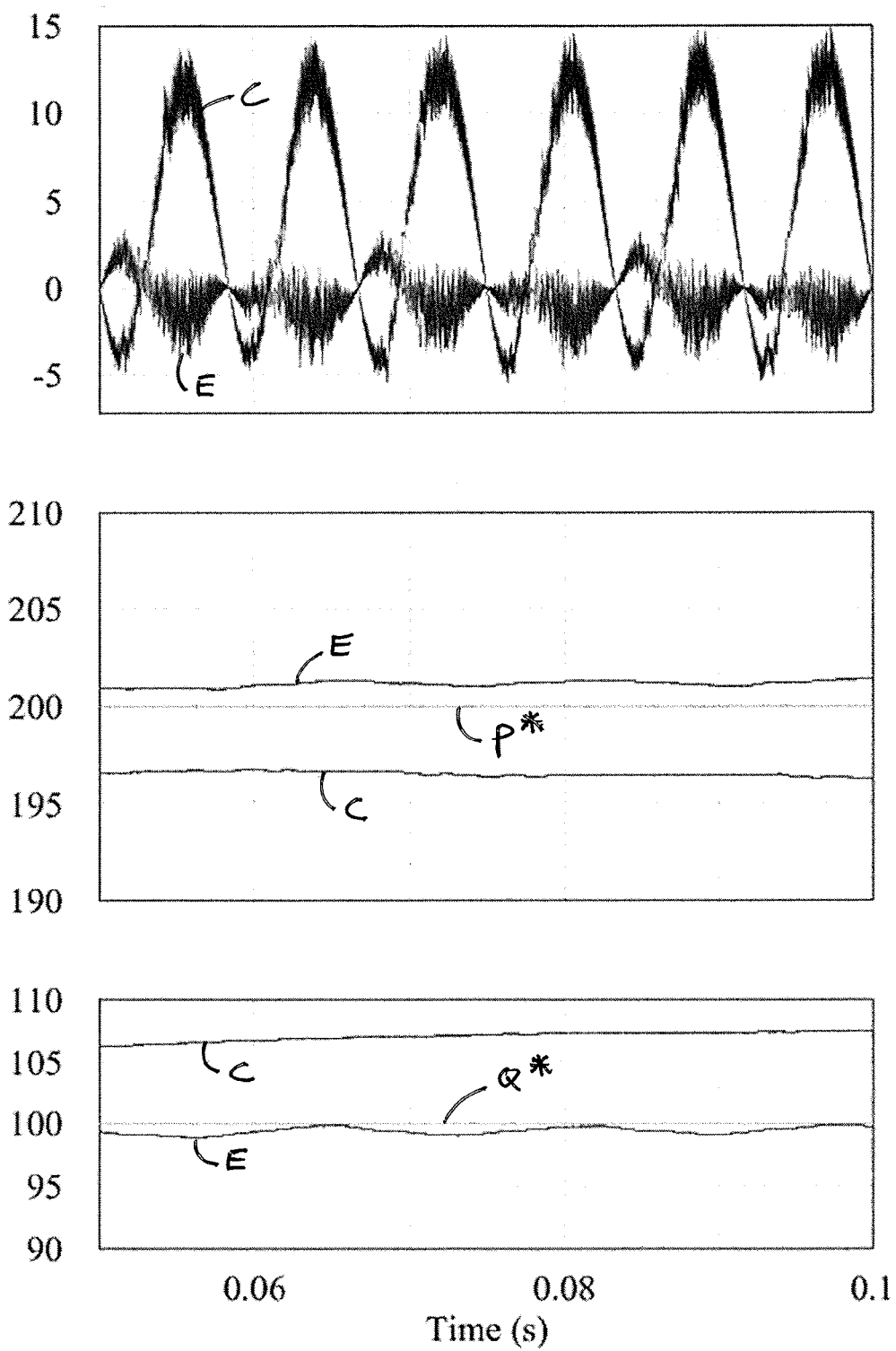
FIG. 8 is a plot showing performance of an embodiment (E) and a conventional (C) method when −50% uncertainty is introduced to the value of inductance in the output filter: top panel, error in instantaneous power; middle panel, real power command and actual real power (P*); bottom panel, reactive power command and actual reactive power (Q*)
Figure 9:
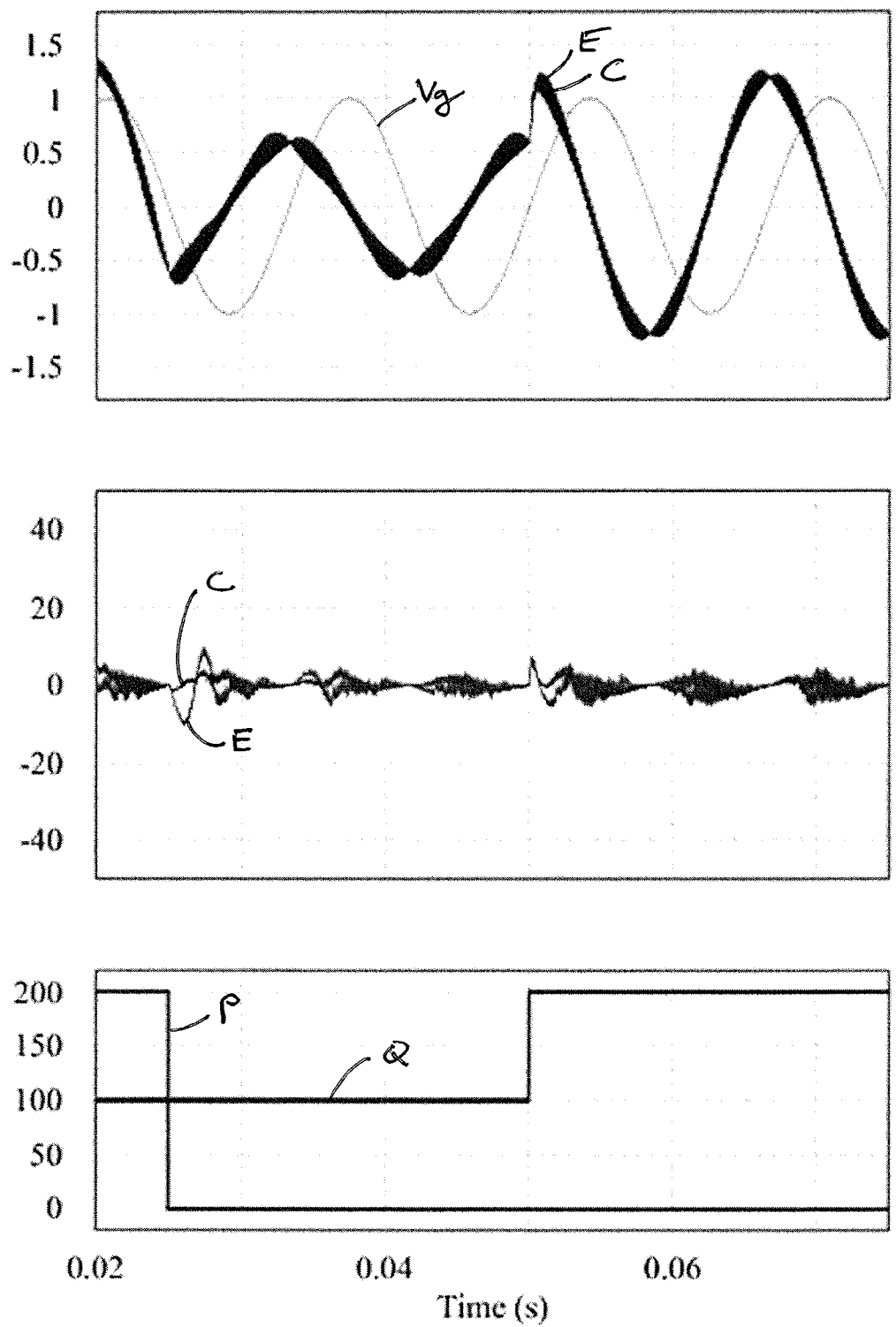
FIG. 9 is a plot showing performance of an embodiment (E) and a conventional (C) method in responding to transients in the active (P) and reactive (Q) power commends: top panel, normalized grid voltage (Vg) and grid current; middle panel, error in instantaneous power; bottom panel, real (P) and reactive (Q) power commands.

FIG. 7 compares performance of a conventional method and an embodiment in tracking 200 W real power and 100 VAR reactive power commands. The conventional method estimates the 90-degree phase-shifted version of the grid current by realizing its differential equation in the controller. That method is based on an open loop state estimator which suffers from uncertainty in the filter parameters. In FIG. 8, an uncertainty of −50% in the value of inductance of the filter is considered in the power circuit of both methods. While the performance of the embodiment remains substantially unaffected by this uncertainty, the conventional method exhibits noticeable steady state errors in both real and reactive power outputs. FIG. 9 shows dynamic responses of the conventional method and an embodiment of the method described herein to transients in the active and reactive power commands. Both methods respond almost instantly to the commands. The dynamic response of the embodiment is flexibly controlled by the parameter $\alpha$.

Example 2. Experimental Results

Figure 10:
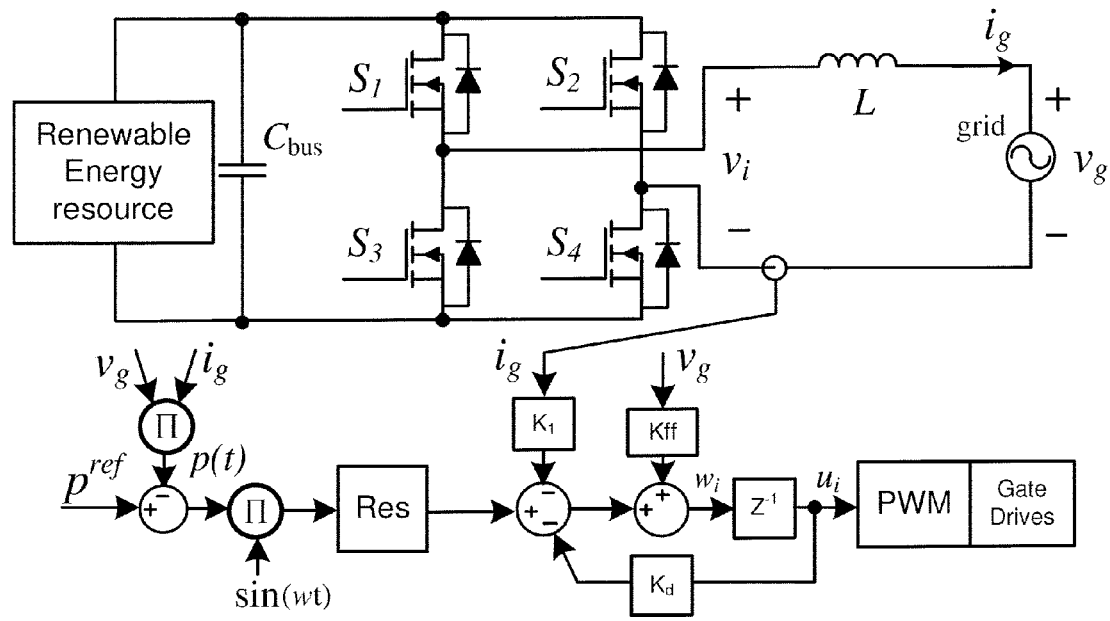
FIG. 10 is a diagram of an embodiment of a power circuit and control system used in an experimental setup.

An experimental setup included a 250 W inverter for connecting a DG system to a power distribution grid. The power circuit was a full bridge inverter fed by a 400 V DC power supply and was connected to the grid through an inductive filter. The grid was a single-phase split-phase system at 60 Hz and with rms value of 240 V. The filter was L=10 mH. A block diagram of the power circuit along with the control system are shown in FIG. 10.

The controller embodiment was digitized, implemented and tested using fixed-point calculations in an Altera FPGA development board of series Stratix II. Since the embodiment was based on a one sample delay, the controller calculations were updated once every sampling period, although the calculations were completed much faster than one sampling period. Impact of one sample delay was considered in the control design as well. The voltage and current feedback signals were sensed using voltage divider and hall effect sensors and converted to digital using 10 bit serial A/D connected to the FPGA board. The grid voltage and current were measured and transferred to a Lecroy digital oscilloscope to show and save the signals.

Figure 11:
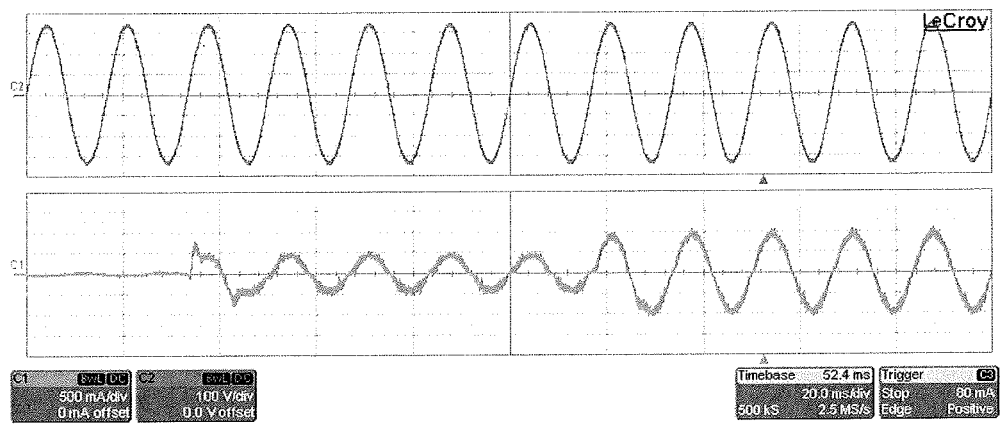
FIG. 11 is a plot of experimental results showing performance of the embodiment of FIG. 10 in tracking active power transients: upper panel, grid voltage, lower panel, grid current.
Figure 12:
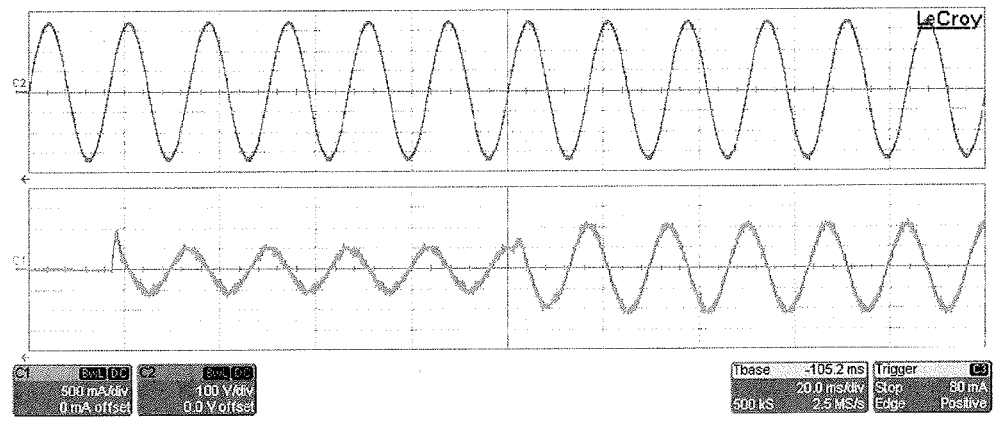
FIG. 12 is a plot of experimental results showing performance of the embodiment of FIG. 10 in tracking reactive power transients: upper panel, grid voltage; lower panel, grid current.
Figure 13:
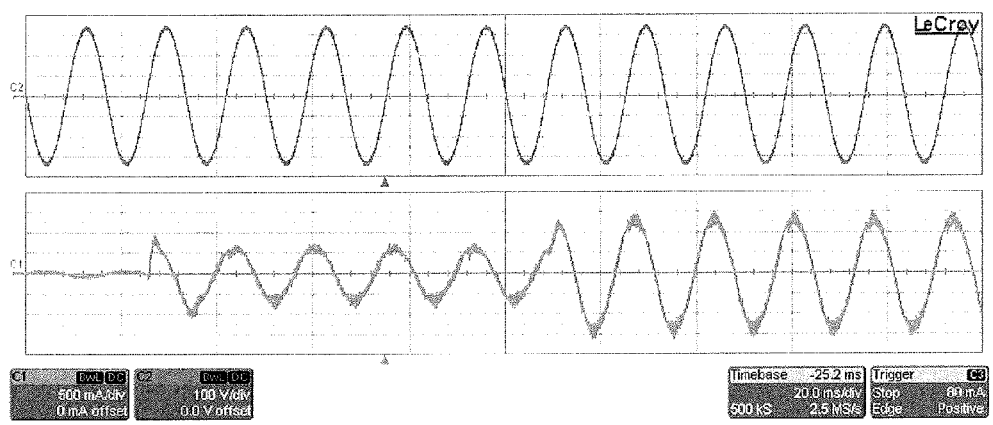
FIG. 13 is a plot of experimental results showing performance of the embodiment of FIG. 10 in tracking simultaneous active/reactive power transients: upper panel, grid voltage; lower panel, grid current.

Three scenarios are presented as follows. In FIG. 11, the reactive power command is zero and the active power command jumps from zero to 100 W and then to 200 W after five cycles. The grid voltage and the injected grid current are shown in FIG. 11. The controller shows very smooth and also fast transient response. In FIG. 12, the active power command is zero and the reactive power command jumps from zero to 100 VAR and then to 200 VAR after five cycles. The command was successfully tracked. In the third case shown in FIG. 13, the active and reactive power commands undergo simultaneous transients from zero to 100 and then to 200 after five cycles. The desirable response of the system was observed. It was observed that when the grid is clean without any harmonics, the output waveforms are substantially harmonic free. The total harmonic distortions of output currents in FIGS. 11, 12, and 13 were measured using Chroma power analyzer and they were all close to 1.9%.

Figure 14:
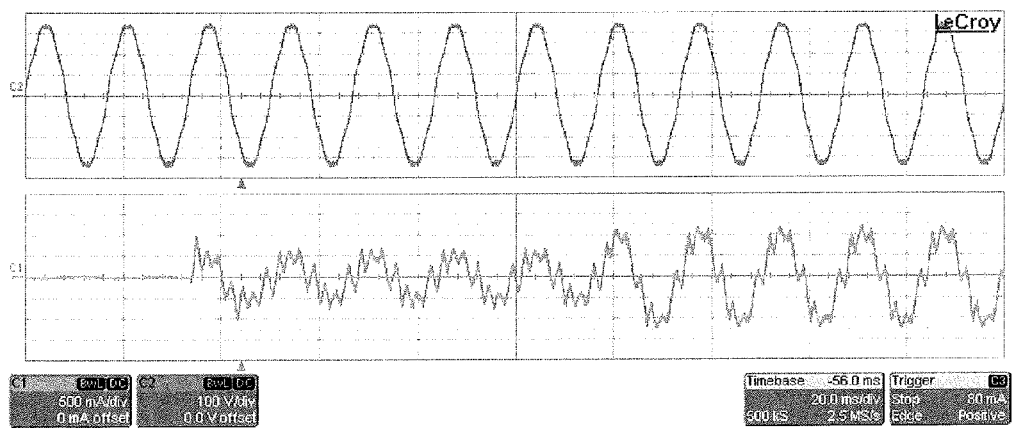
FIG. 14 is a plot of experimental results showing performance of the embodiment of FIG. 10 without any harmonic compensation block in tracking active power transients while the grid is highly distorted: upper panel, grid voltage; lower panel, grid current.
Figure 15:
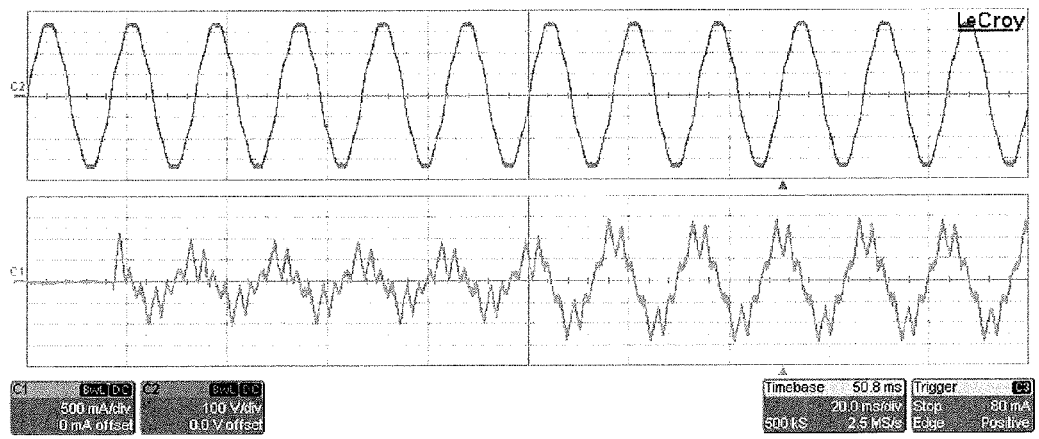
FIG. 15 is a plot of experimental results showing performance of the embodiment of FIG. 10 without any harmonic compensation block in tracking reactive power transients while the grid is highly distorted: upper panel, grid voltage; lower panel, grid current.

With the grid voltage distorted, experiments were carried out to investigate the effect of grid harmonics at the output current harmonics. The grid voltage was distorted with THD of 4.65%, where the 5th harmonic component was 2.45% and 7th harmonic component was 3.95%. FIG. 14 shows cases where the active power transient was from zero to 100 W and then to 200 W after five cycles (upper trace, grid voltage; lower trace, grid current). Similarly, FIG. 15 shows the case where the reactive power transient is from zero to 100 VAR and then to 200 VAR after five cycles. The output current THD is about 24% in both cases. It is noted that this will be the case for any conventional method since there is no compensation for harmonics in the control system. Since the THD is too high, the controller should be modified to eliminate the effect of harmonics at the output.

Figure 16:
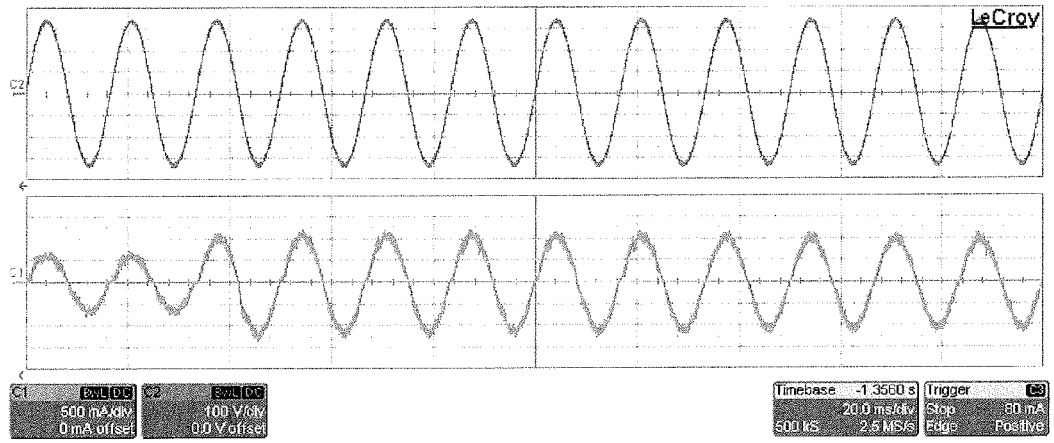
FIG. 16 is a plot of experimental results showing performance of the embodiment of FIG. 10 with third, fifth, and seventh harmonic compensation blocks in tracking active power transients while the grid is not distorted: upper panel, grid voltage; lower panel, grid current.
Figure 17:
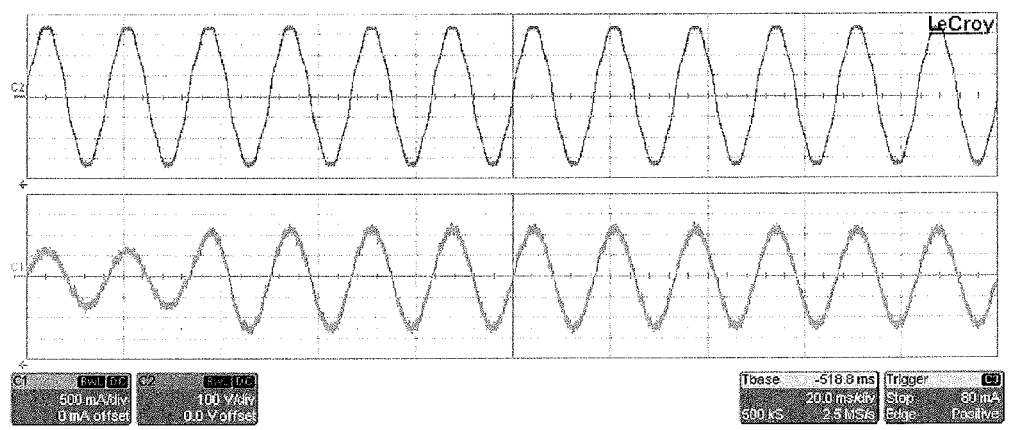
FIG. 17 is a plot of experimental results showing performance of the embodiment of FIG. 10 with third, fifth, and seventh harmonic compensation blocks in tracking active power transients while the grid is highly distorted: upper panel, grid voltage; lower panel, grid current.

As shown in FIG. 5, harmonic blocks can be added to eliminate the effect of grid harmonics. In the experimental setup, 3rd, $5^{th}$, and 7st harmonic blocks were designed and added as shown in FIG. 5. For the active power transient case with modified controller the waveforms are shown in FIGS. 16 and 17 where the grid is harmonic free and distorted, respectively. In this embodiment the output current THD was increased from 2.5% to only 3.4%, as opposed to the previous case which was 24%

The contents of all references, pending patent applications, and published patents cited throughout this application are hereby expressly incorporated by reference.

EQUIVALENTS

Those skilled in the art will recognize or be able to ascertain variants of the embodiments described herein. Such variants are within the scope of the invention and are covered by the appended claims.

The invention claimed is:
1. A single phase power system controller, comprising:
an error signal generator that generates an error signal from an instantaneous power reference signal and only one feedback signal corresponding to the instantaneous output power delivered to a power distribution grid; and
a modulator that modulates the error signal according to a trigonometric function of a grid voltage phase angle and produces a control signal for a resonant controller;
wherein the resonant controller simultaneously controls real and reactive power delivered to the power distribution grid using the only one feedback signal corresponding to the instantaneous output power.
2. The single phase power system controller of claim 1, further comprising an instantaneous power calculator that provides the instantaneous power reference signal from active and reactive power reference values and a grid voltage phase angle.
3. The single phase power system controller of claim 1, further comprising a phase-locked loop that determines the grid voltage phase angle from the grid voltage.
4. The single phase power system controller of claim 1, wherein the resonant controller is a high gain resonant controller at a grid frequency.
5. The single phase power system controller of claim 1, further comprising a harmonic compensation loop that substantially reduces one or more grid current harmonic.

6. The single phase power system controller of claim 5, wherein the harmonic compensation loop comprises one or more harmonic controller tuned to one or more grid harmonic.

7. The single phase power system controller of claim 6, wherein the one or more harmonic controller receives an input signal derived from the grid current.

8. The single phase power system controller of claim 1, further comprising one or more feedback loops that provide one or more adjustable tuning gain according to a constant, to improve dynamic response of the system.

9. The single phase power system controller of claim 1, wherein input to the system is provided by a renewable energy source.

10. The single phase power system controller of claim 9, wherein input to the system is provided by a photovoltaic source.

11. A method for controlling a single phase power system, comprising:
    generating an error signal from an instantaneous power reference signal and only one feedback signal corresponding to the instantaneous output power delivered to a power distribution grid; and
    modulating the error signal according to a trigonometric function of a grid voltage phase angle and producing a control signal for a resonant controller;
    wherein real and reactive power delivered to the power distribution grid are controlled simultaneously using the only one feedback signal corresponding to the instantaneous output power.

12. The method of claim 11, further comprising providing the instantaneous power reference signal from active and reactive power reference values and the grid voltage phase angle.

13. The method of claim 11, further comprising using a phase-locked loop to determine the grid voltage phase angle from the grid voltage.

14. The method of claim 11, wherein the resonant controller is a high gain resonant controller at a grid frequency.

15. The method of claim 11, further comprising using a harmonic compensation loop to substantially reduce one or more grid current harmonic.

16. The method of claim 15, wherein the harmonic compensation loop comprises one or more harmonic controller tuned to one or more grid harmonic.

17. The method of claim 16, wherein the one or more harmonic controller receives an input signal derived from the grid current.

18. The method of claim 11, further comprising using one or more feedback loops to provide one or more adjustable tuning gain according to a constant, to improve dynamic response of the system.

19. The method of claim 11, wherein input to the system is provided by a renewable energy source.

20. The method of claim 19, wherein input to the system is provided by a photovoltaic source.

* * * * *